M. A. LANE.
AUTOMOBILE POWER APPARATUS.
APPLICATION FILED MAY 3, 1919.

1,331,652.

Patented Feb. 24, 1920.

Inventor
Major A. Lane,
By Franklin N. Hough
Attorney

UNITED STATES PATENT OFFICE.

MAJOR A. LANE, OF PAOLA, KANSAS.

AUTOMOBILE POWER APPARATUS.

1,331,652.   Specification of Letters Patent.   Patented Feb. 24, 1920.

Application filed May 3, 1919. Serial No. 294,526.

*To all whom it may concern:*

Be it known that I, MAJOR A. LANE, a citizen of the United States, residing at Paola, in the county of Miami and State of Kansas, have invented certain new and useful Improvements in Automobile Power Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for utilizing the power from an automobile engine for light work, such as driving saws, milking machines, and machines of various kinds, and comprises essentially a frame carrying means for raising the wheel from which the power is to be taken, and in the providing of a novel means of attachment to the driving wheel, a pulley from which power may be transmitted.

The invention comprises various details of construction, combination and arrangement of parts which will be hereinafter fully described, and then specifically defined in the appended claims.

My invention is illustrated in the accompanying drawings which, with the letters of reference marked thereon, form a part of this application, and in which:

Figure 1 is a side elevation of the apparatus.

Fig. 2 a rear view.

Figure 1:
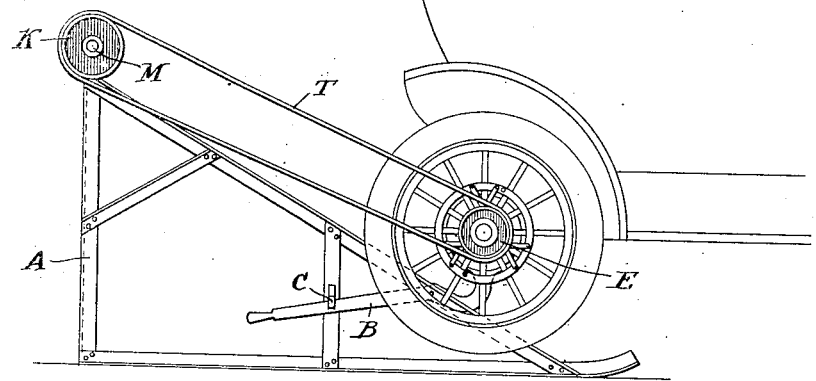
Figure 2:
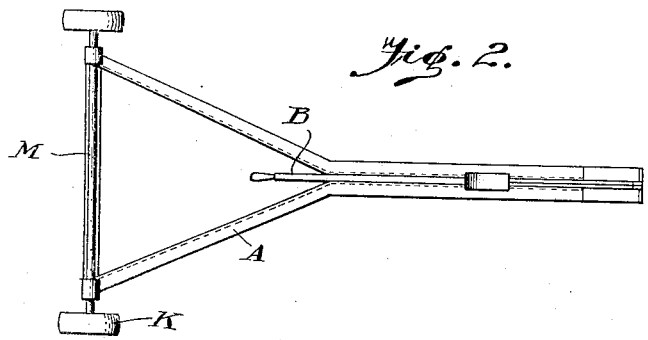
Figure 3:
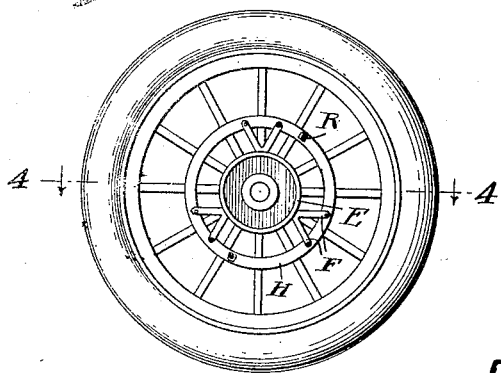
Fig. 3 is a detail in elevation of one wheel and the pulley attachment.
Figure 4:
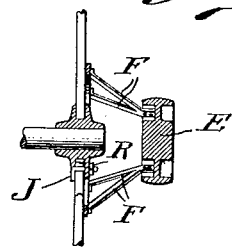
Fig. 4 is a cross sectional view taken on line 4—4 of Fig. 3.

Reference now being had to the details of the drawings by letter:

A designates a frame which may be of any approved form which may be adapted for the purpose, preferably of metal suitably braced to withstand pressure incident to lifting and supporting a considerable weight, and B is a lever which is pivoted to the frame adapted to engage under the axle at one side of an automobile from which it is desired to transmit power. A hook C is placed on one of the standards of the frame and under which the lever may be caught to hold the lever with its load so that the driving wheel will rotate freely.

To one of the driving wheels is attached a pulley E which is fastened by means of braces F to a metallic ring H adapted to receive hooks J which engage over the spokes of the wheel, and have nuts R fitted upon the threaded ends. A pulley K is fixed to the shaft M journaled in the frame, and T designates a belt passing over said pulley.

The power from the apparatus may be transmitted to any location desired for driving various machines such as saws, drills, etc.

In operation, the frame is placed underneath one of the wheels which is engaged by the concaved end of the lever and by tilting the latter upon its pivot the wheel may be raised sufficiently to clear the ground or floor upon which the automobile rests, after which by driving the wheel power may be transmitted as will be readily understood.

What I claim to be new is:

A device for attachment to the wheels of an automobile comprising a pulley having recesses in the face thereof, U-shaped brace bars each fastened at its apex in a recess in the pulley, a ring adapted for attachment to the spokes of a wheel and to which the outer ends of said bars are fastened.

In testimony whereof I hereunto affix my signature.

M. A. LANE.